United States Patent [19]

Brandli

[11] 4,358,977
[45] Nov. 16, 1982

[54] CUTOFF PRESS
[75] Inventor: John R. Brandli, St. Charles, Ill.
[73] Assignee: Turek & Heller Machine, Inc., Addison, Ill.
[21] Appl. No.: 299,649
[22] Filed: Sep. 4, 1981

Related U.S. Application Data

[63] Continuation of Ser. No. 127,640, Mar. 6, 1980, abandoned.
[51] Int. Cl.³ .................... B23D 21/00; B23D 25/04; B26D 1/60; B26D 3/16
[52] U.S. Cl. ........................................ 83/319; 83/320
[58] Field of Search ................ 83/319, 320, 328, 632, 83/615, 626; 74/44

[56] References Cited

U.S. PATENT DOCUMENTS

| 1,367,075 | 2/1921 | Myers | 74/44 |
|---|---|---|---|
| 1,918,784 | 7/1933 | Rode | 74/44 |
| 2,156,323 | 5/1939 | Tishken | 83/320 X |
| 2,550,063 | 4/1951 | Johansen | 74/44 |
| 3,129,624 | 4/1964 | Auer | 83/320 X |
| 3,288,011 | 11/1966 | Borzym | 83/310 |
| 3,288,012 | 11/1966 | Borzym | 83/310 |
| 3,340,756 | 9/1967 | Mize | 83/320 |
| 3,881,382 | 5/1975 | Rasenberger et al. | 83/320 X |
| 3,994,191 | 11/1976 | Pozsgay | 83/320 |
| 4,228,706 | 10/1980 | Borzym | 83/320 |

Primary Examiner—Frank T. Yost
Attorney, Agent, or Firm—Robert L. Lindgren; Robert W. Slater

[57] ABSTRACT

Cutoff press for cutting tube into segments including a frame slidably supporting a cutoff die set wherein the ram is mounted for vertical movement only and driven by counter-rotating drive shafts having connecting rods, the upper ends of which move in an orbital path and the lower ends of which move in a linear path.

12 Claims, 5 Drawing Figures

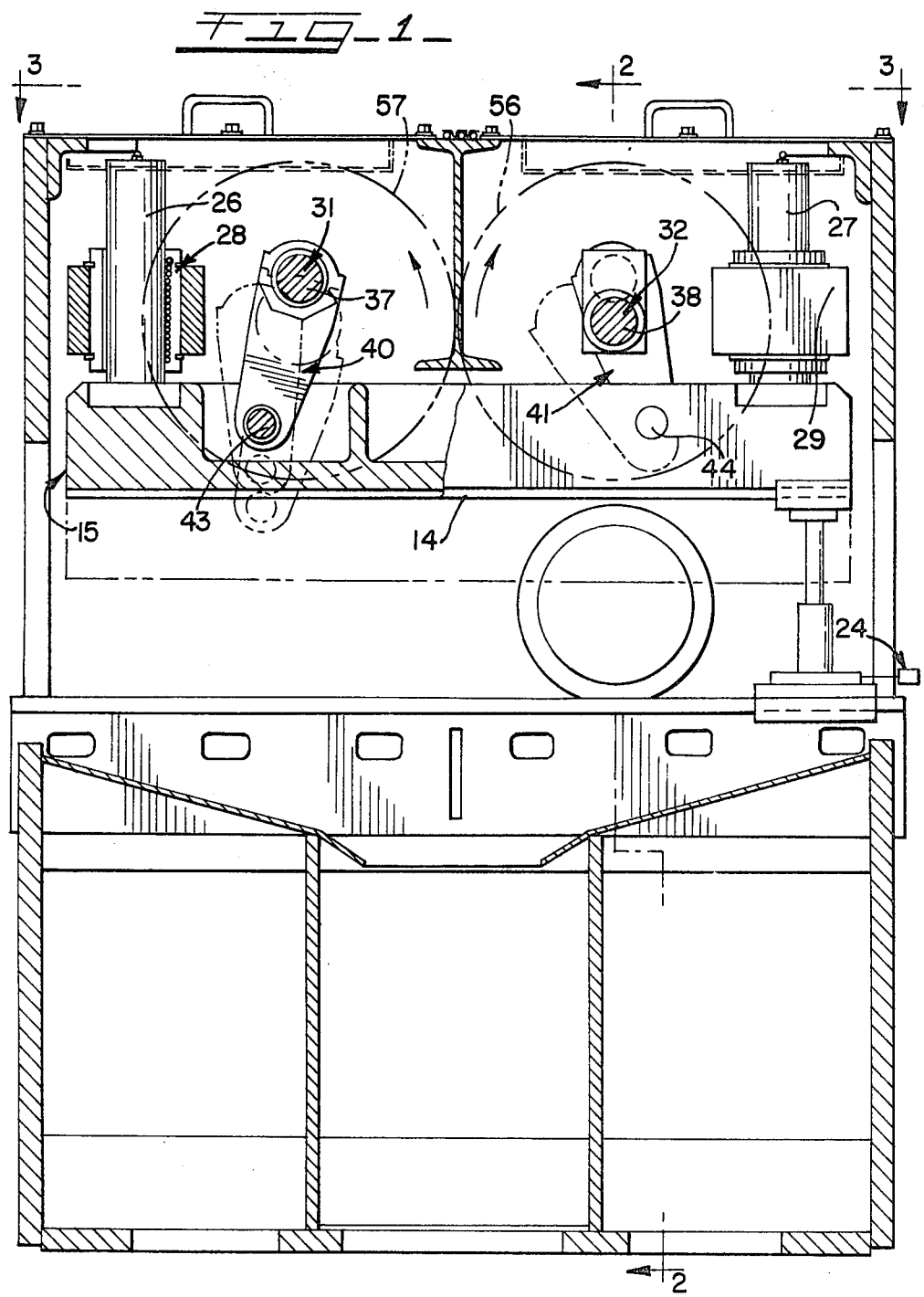

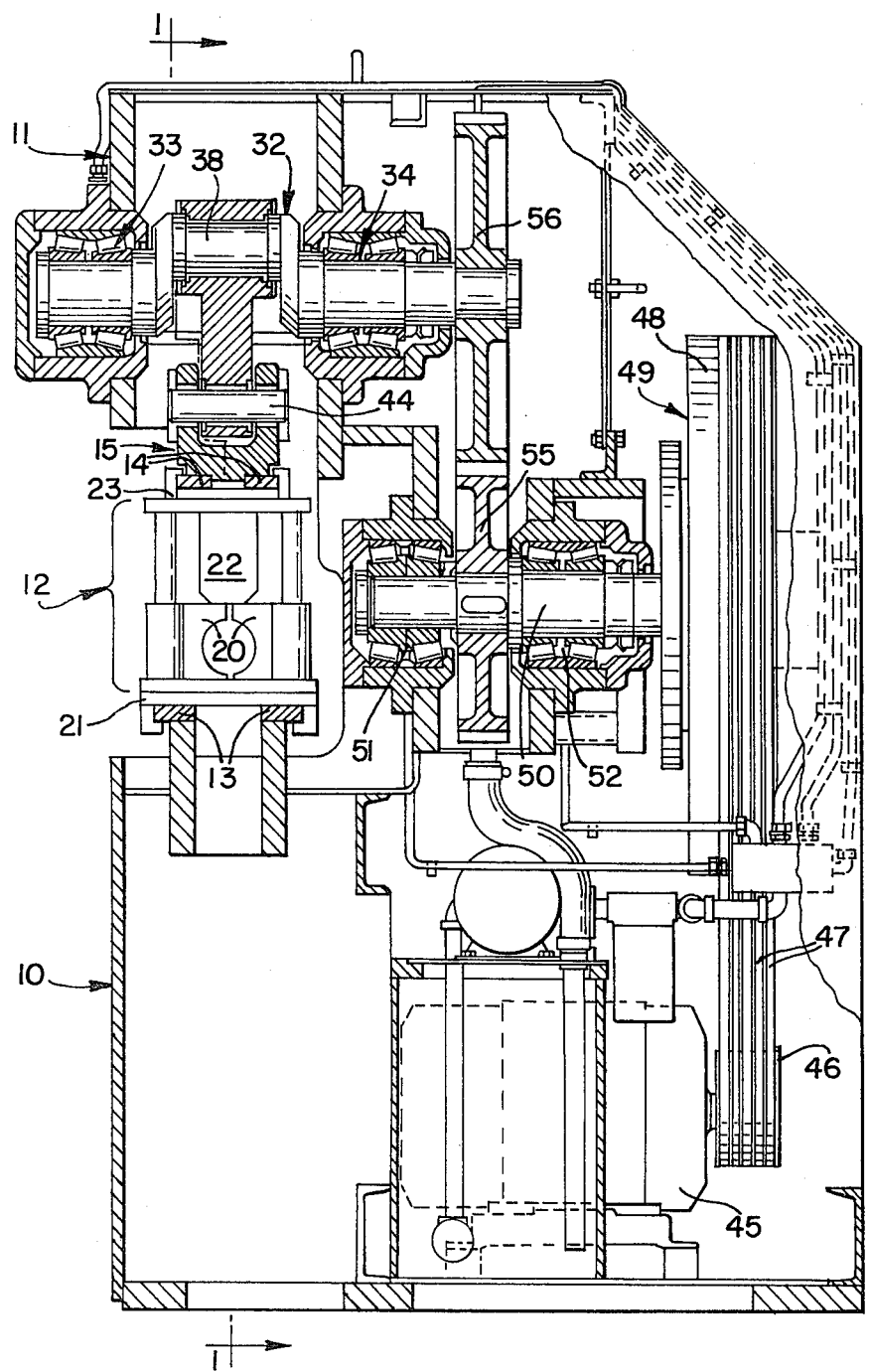

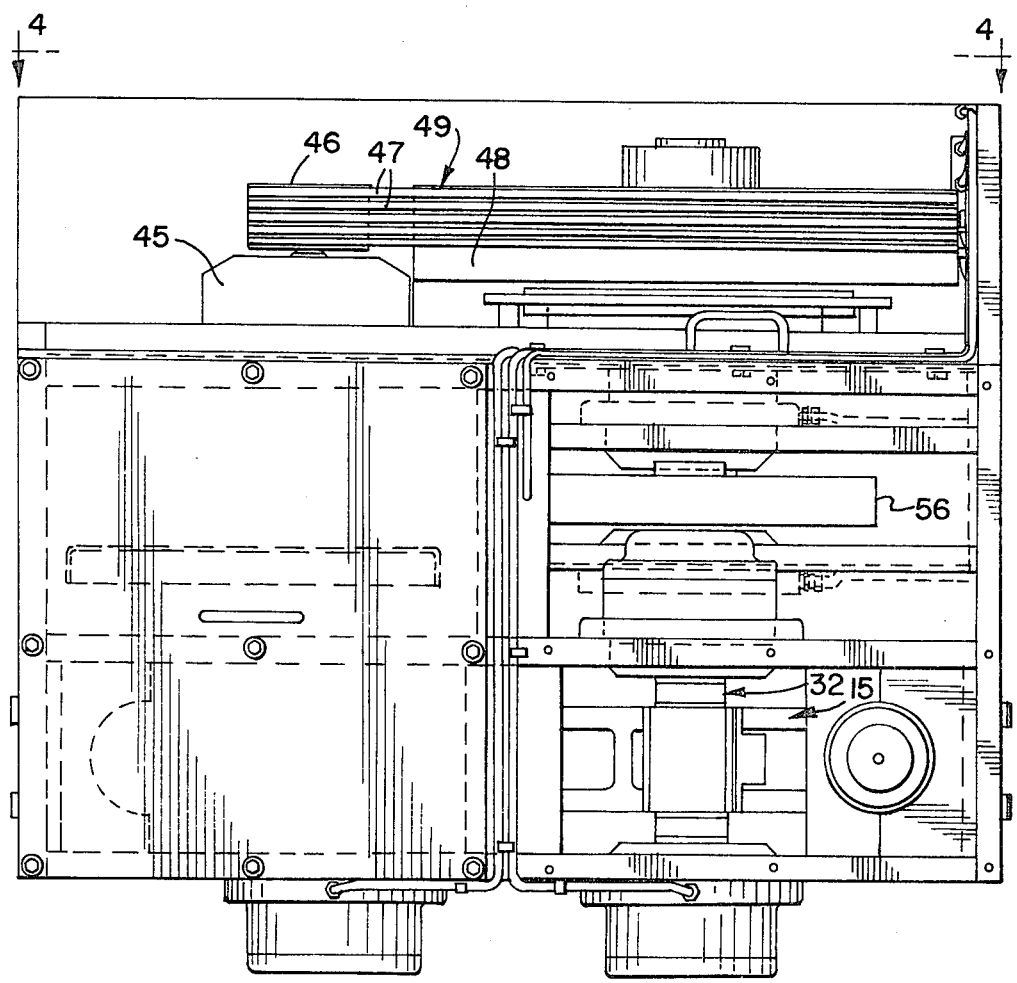

FIG_4
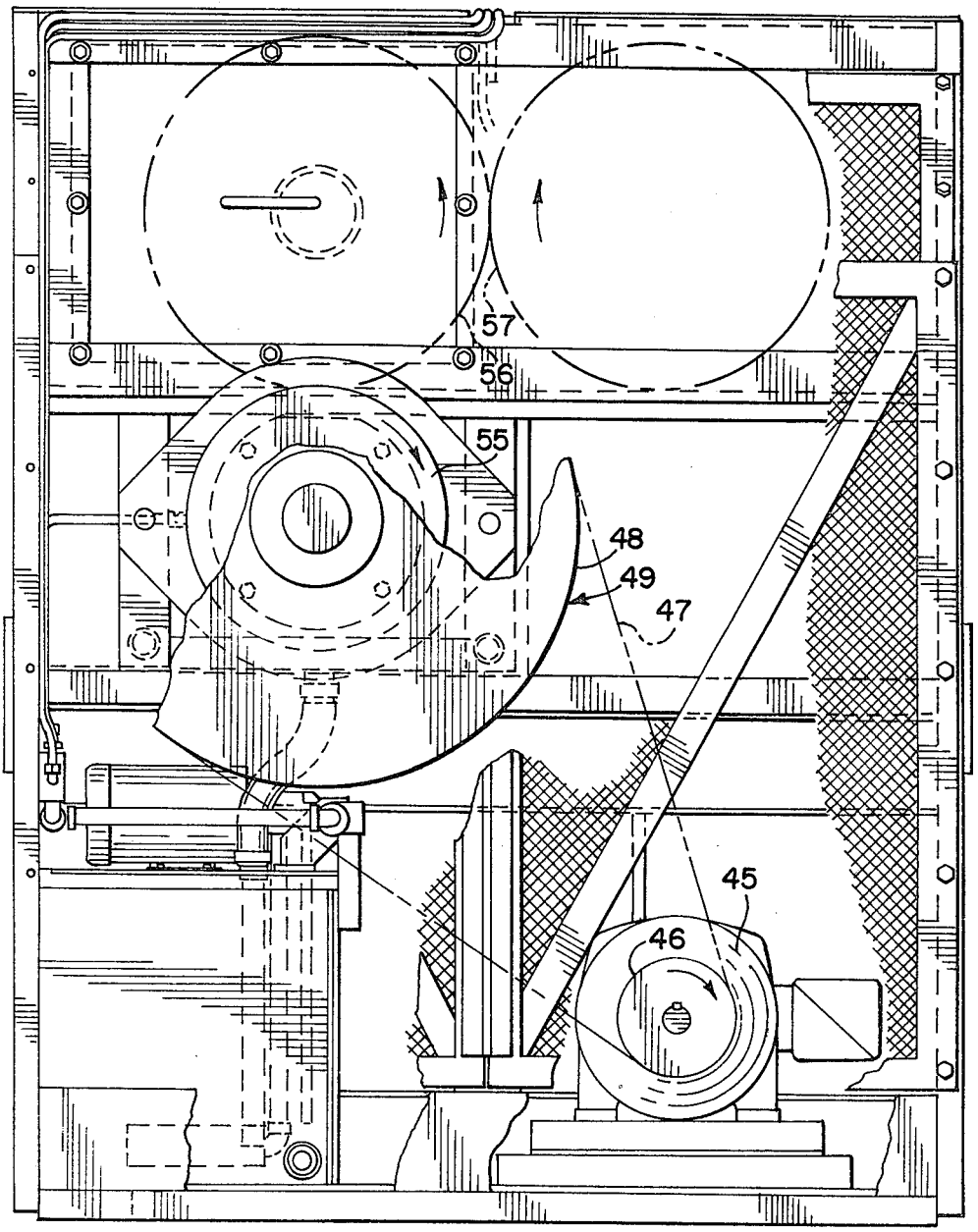

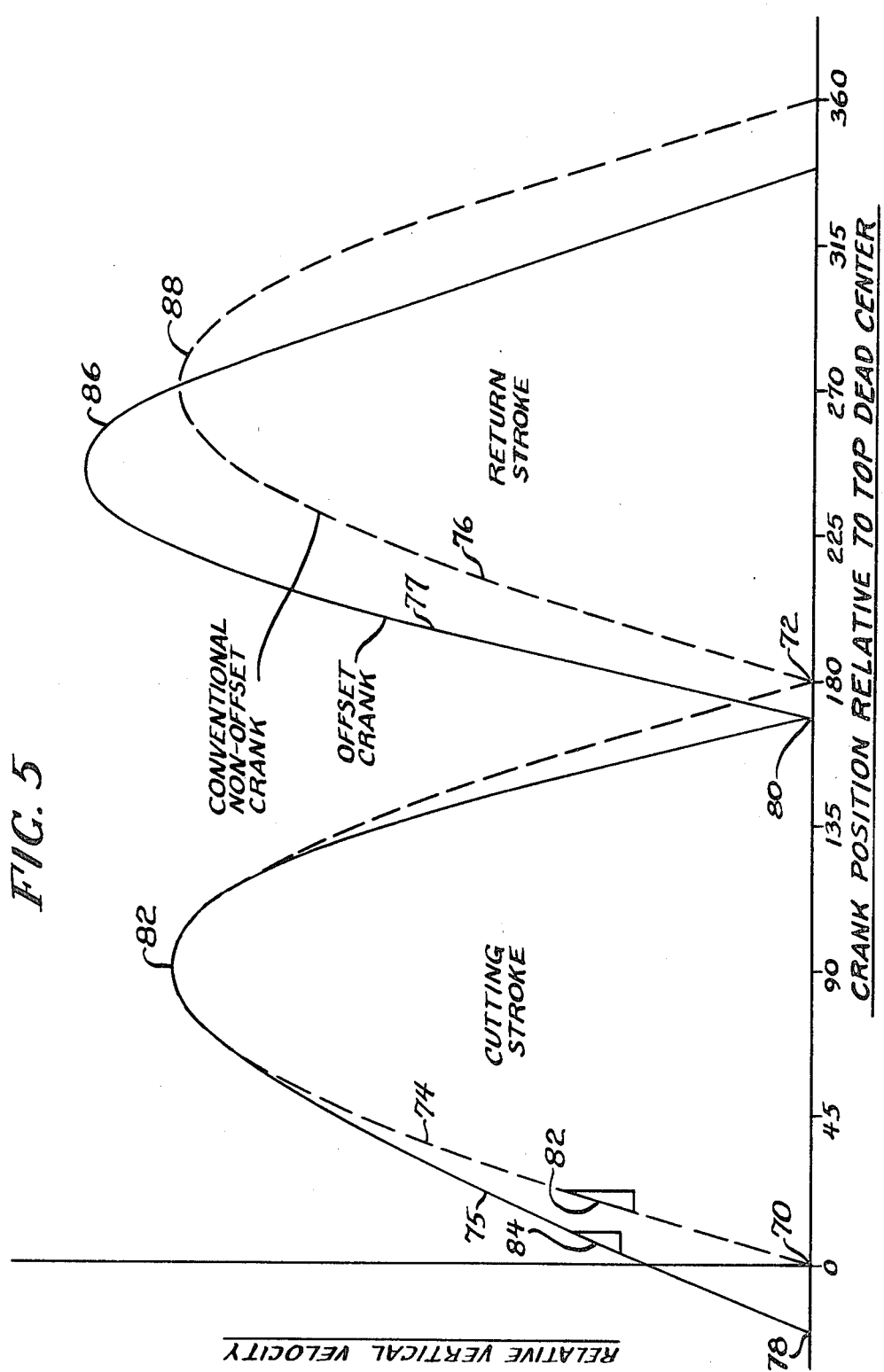

CUTOFF PRESS

This is a continuation of application Ser. No. 127,640 filed on Mar. 6, 1980, now abandoned.

This invention relates in general to a cutoff press for cutting enlongated moving tube stock into segments, and more particularly to a cutoff press for cutting metal tube into segments which tube is produced on a continuous basis in a tube mill.

Heretofore, it has been well known to cut metal tubing into segments wherein the tubing is being continuously produced by a pipe mill and moved at a constant rate through a tub cutting machine. Such a machine has been sometimes referred to as a flying cutoff machine, such as of the type disclosed in U.S. Pat. Nos. 3,288,011 and 3,288,012, wherein a shearing mechanism or die set is slidably mounted between a bed portion and head portion of a frame and where a moving ram is mountable on the head portion while the bed portion is in fixed relation thereto and where the die set or shearing mechanism is movable with the tubing during the cutoff cycle of the machine and actuated by the moving ram. These prior art machines have mounted the rams for swinging or orbital movement during the cutting cycle. Accordingly, such a ram would have not only a vertical movement but also a horizontal movement.

Such machines can encounter accuracy problems with respect to the cut tube since the ram undergoes simultaneous horizontal and vertical movements which disturb the parallelism of the ram relative to the bed portion of the frame along which the tubing travels and produces horizontal stability in the ram stroke. The relative horizontal movement between the ram and die set of such devices and the resulting variation in linear speeds of each can produce inaccuracies in shearing location and variation in tube length.

The cutoff press of the present invention obviates the heretofore known difficulties in providing a machine which allows only vertical movement of the ram, thereby resulting in maximum horizontal stability of the ram and minimizing the possibility of ram deflection. This is achieved in part in the invention by utilization of counter-rotating cranks carrying symmetrically disposed wrist pins and connecting rods which remain symmetrically disposed throughout each shear cycle maintaining balanced forces throughout each such cycle. This eliminates relative horizontal movement between the ram and die set not occasioned by the movement of the die set itself thereby minimizing the resulting variations in linear speeds and shearing location inaccuracies which would otherwise be produced thereby.

Further, the machine of the present invention maintains maximum parallelism between the ram and the bed portion of the frame during the cutting stroke without regard to the position of the shearing mechanism along the ram. The connecting rods driven by crankshafts are a unique part of the driving mechanism, and the rods are so structured and arranged that they maintain a nearly vertical posture during the cutting stroke. To this end the wrist pins connecting the rods to the ram are offset from the crankshafts, this also allowing the cutting stroke to commence before top dead center thereby affording a greater angular rotation of the cranks during the cutting stroke to accelerate the ram to the maximum velocity. Further, the crankshafts rotate in opposite directions, thereby applying equal and opposite balanced horizontal forces to the ram which further stabilize the ram as the shearing mechanism slides along the ram and frame bed portion. Since the counter-rotating cranks are directly geared to one another, gear backlash, which can occur with independently geared cranks as in the prior art, can be significantly reduced by the press of the invention.

It is therefore an object of the present invention to provide a new and improved cutoff press for cutting traveling tubular stock into segments and particularly for cutting traveling metal tubing into segments.

The symmetrically disposed drive elements of the press of the invention maintain symmetry during shear cycles and thereby application of balanced forces during such cycles.

Another object of this invention is in the provision of a cutoff press capable of more accurately cutting tubular stock into segments and wherein maximum horizontal stability is maintained in the ram to minimize ram deflection and obtain maximum parallelism between the upper and lower slide rails regardless of the point along the ram where the resistant shearing or cutting force is applied by the unique ram drive.

Cutting inaccuracies can be wholly eliminated or significantly reduced with the cutoff press of the invention. This is accomplished by elimination of relative horizontal movement between the ram and die set carried thereby, not occasioned by the movement of the die set itself. Direct gearing of the counter-rotating cranks utilized by the cutoff press of the invention will significantly reduce gear backlash and the cutting inaccuracies associated with it.

Another feature of the invention is in the provision of an improved cutoff press having a vertically movable ram and crankshafts connected to the ram such that the connecting rods between the crankshafts and ram are maintained in a nearly vertical position throughout the cutting portion of the cam cycle, thereby maximizing horizontal stability to the ram.

Other objects, features and advantages of the invention will be apparent from the following detailed disclosure, taken in conjunction with the accompanying sheets of drawings, wherein like reference numerals refer to like parts, in which:

FIG. 1 is a vertical sectional view taken through the cutoff press of the invention and substantially along line 1—1 of FIG. 2 with some parts broken away;

FIG. 2 is a vertical sectional view of the cutoff press taken substantially along line 2—2 of FIG. 1;

FIG. 3 is a top plan view of the cutoff press taken substantially along line 3—3 of FIG. 1 and with some parts omitted for purposes of showing underlying parts; and FIG. 4 is a rear elevational view of the cutoff press with some parts cut away to show underlying parts.

FIG. 5 is a graphical representation showing the relative vertical ram velocities as a function of crank angular position for a conventional non-offset crank and for the offset crank of this invention.

The cutoff press of the present invention includes a frame supporting fixed slidable rails and a movable ram having slide rails along which a shearing mechanism or die set is slidably mounted to allow the shearing mechanism to be slidably driven during the cutoff cycles of the machine. The ram is constrained such that it will have purely vertical movement throughout the cutoff cycle which includes a downward stroke and an upward stroke. The drive system for the ram while including a conventional clutch and brake assembly operable during the cutoff cycle, causes the opposite rotational drive of a pair of crankshafts that are drivingly connected to the ram by means of connecting rods. The arrangement of the drive connections of the connecting rod to the crankshafts and the ram is unique, together with the rotational direction of the crankshafts, such as to cause the connecting rods to move along a substantially vertical path during the downward cutting stroke of the ram cutoff cycle. Accordingly, maximum horizontal stability in the ram is obtained together with maximum parallelism between the fixed slide rails and the ram slide rails, thereby minimizing undesirable ram deflection.

Referring now to the drawings, the cutoff press of the present invention includes generally a frame having a bed portion 10 and a head portion 11 between which the tube to be cut travels rectilinearly or along a horizontal path. A shearing mechanism or cutoff die set 12 is slidably supported on the frame over horizontally extending lower fixed slide rails 13 mounted on the bed portion 10 and movable upper slide rails 14 carried on a ram 15 supported from the head portion of the frame. The path of the tube movement is parallel to the upper and lower slide rails. The ram 15 is mounted on the frame for pure vertical movement and a drive system, which will be hereinafter disclosed, drives the ram through a cutoff cycle which includes a downward cutting stroke and an upward return stroke.

The shearing mechanism or die set 12 includes die jaws 20 carried on a lower die slide 21 and a shear blade or knife 22 carried on an upper die slide 23 supported on the ram. It will be appreciated that the die set 12 is suitably driven along the frame of the machine at the same speed as the tubing being run through the machine and that the die jaws 20 grip the tubing during the cutoff cycle of the machine and while the cutoff blade 22 is moving through the cutting stroke of the cutting cycle. Any suitable drive means may be provided for driving the die slide along with the traveling tube during the cutoff cycle and returning it for further use in the subsequent cutting operations, and such is illustrated diagrammatically in FIG. 1 at 24.

The ram 15 is vertically movable and constrained against horizontal movement by a pair of parallel guide posts 26 and 27 extending above the ram and perpendicular to the slide rails 14, which guide posts are therefore rigidly attached to opposite ends of the ram and guidably received in anti-friction guide bushings 28 and 29 respectively, the latter of which are suitably supported by the head portion of the frame. Thus, the ram moves along a rectilinear path that is perpendicular to the path of the tube and relative linear movement between ram 15 and die set 12, not occasioned by movement of the die set itself, is obviated. The guide bushings 28 and 29 may be of any suitable type such as the well known ball bushings type utilized for slidably receiving guide posts.

Vertical movement of the ram is obtained by a pair of horizontally spaced apart crankshafts 31 and 32 rotatably mounted in bearings held by the head portion of the frame. The crankshaft axes of rotation are parallel to each other and extend perpendicular to the horizontal path of the tube or workpiece. Bearings 33 and 34 are shown in FIG. 2 for mounting of crankshaft 32, and it will be appreciated that similar type bearings are utilized for mounting the crankshaft 31. The crankshafts 31 and 32 are driven in opposite directions in timed relation and the axes of crankshaft rotation are along the same horizontal plane which is parallel to the path of the tube movement. Further, the crankshafts are identical in shape and size and each includes respectively cranks 36 and 37 having crank centers eccentric to the axes of crankshaft rotation.

Connecting rods 40 and 41 are respectively provided for cranks 31 and 32 to drivingly interconnect the crankshafts and ram 15. The upper ends of the connecting rods are connected to the cranks 37 and 38, while the lower ends are respectively pivotally connected to wrist pins 43 and 44 which are mounted on the upper end of the ram 15. The wrist pin axes are parallel to each other, while extending perpendicular to the path and being in a common plane parallel to the path of tube movement. Inasmuch as the wrist pins are fixed to the ram, the lower ends of the connecting rods move through a linear vertical path, while the upper ends of the connecting rods move through an orbital path.

Power for driving the crankshafts and the ram is obtained from a motor 45 having a drive pulley 46 with a plurality of drive belts 47 trained thereover and also over a pulley 48 which is part of a fly wheel-clutch-brake unit 49 mounted on and co-rotatable with a drive shaft 50. The drive shaft 50 rotates on an axis that is parallel to the axis of the crankshafts 31 and 32 and the drive shaft is bearingly supported by the frame by spaced bearings 51 and 52. A drive gear 55 is mounted on and keyed to the drive shaft 50 and in meshing engagement with a crank gear 56 keyed to the crankshaft 32. A crank gear 57 of equal pitch diameter to crank gear 56 is in meshing engagement therewith and mounted on the crankshaft 31 for co-rotation therewith. Accordingly, when the fly wheel-clutch-brake unit 49 receives the appropriate signal for a cutoff cycle, the driven pulley 48 will be connected to the drive shaft 50 to drive same which, in turn through the drive gear 55 and the crank gears 56 and 57, drives the cranks 31 and 32 in counter-rotating directions as indicated by the arrows in FIG. 1 to drive the ram 15 through a cutoff cycle in a manner significantly diminishing gear backlash potential.

The cutoff cycle includes movement of the ram 15 and its associated upper die set through a downward cutting stroke and an upward return stroke as the die set is driven along the slide rails of the ram and bed portion of the machine. Since the ram is restrained against any horizontal motion by means of the guide posts 26, the motion imparted to the ram through the connecting rods is purely vertical.

The crank gears are connected to the crankshafts such that imaginary planes passing through the crankshaft centers of rotation and the crank centers of each crankshaft are precisely perpendicular to the fixed slide rails 13 at the same time during the cutoff cycle and during the cutting stroke thereof. Thus, the crankshafts and associated ram linkages are driven in symmetrically opposed timed relation. Since the crankshafts turn in opposite directions, the horizontal forces applied to the ram through the connecting rods are equal and opposite to each other, thereby assisting in the stabilizing of the ram as the shearing mechanism slides along the fixed slide rails of the frame and the slide rails of the ram.

Further, since the wrist pins are offset from the rotational axes of the crankshafts, the connecting rods attain a nearly vertical position during the cutting stroke of the cycle and the vertical force applied to the shearing mechanism is maximized, thereby essentially avoiding the application of any net horizontal forces to the ram during the cutting stroke. This enhances the maximum horizontal stability to the ram and the maximum parallelism between the upper slide rails on the ram and the lower slide rails on the frame, while minimizing the possibility of ram deflection regardless of where the resistant or shearing force is applied along the length of the ram. The cranks reach their closest proximity to each other on the return or upward stroke where maximum horizontal stability is not required because the tubing has already been severed and the cutting die are no longer under a cutting load.

As the rotation of the crankshafts approaches one complete revolution or 360 degrees, a rotary sensing device (not shown) produces a signal causing the clutch of unit 49 to disengage and the brake thereof to engage stopping the crank gears and cranks after one complete 360 degree rotation. This rotation, as discussed below, commences and terminates prior to the crank reaching its top-dead-center position.

FIG. 5 illustrates vertical ram velocity as a function of angular crank position for an offset crank cut-off press of this invention having a crank throw of 2.75 inches; a connecting rod of 10 inches and wrist pin offset of 2.5 inches. Also llustrated in FIG. 5 is a conventional cutoff of substantially similar dimension having no wrist pin offset. The conventional press commences it cutting stroke, at 70 FIG. 5, when the crank passes through top-dead-center and completes this stroke at 72 when the crank reaches bottom-dead-center. It can be appreciated that this conventional cutoff cycle includes two strokes, a cutting stroke 74 and a return stroke 76, each having substantially identical 180 degree velocity and displacement contours.

By contrast, the offset crank of this invention exhibits non-symmetrical cutting 75 and return 77 strokes, wherein the cutting stroke commences, at 78, approximately 20 degrees prior to the crank reaching top-dead-center and terminates, at 80, approximately 12 degrees before reaching bottom-dead-center. This results in a cutting stroke of approximately 188 degrees and return stroke of 172 degrees.

The maximum cutting stroke ram velocity for the offset crank occurs at approximately the 90 degree crank position, FIG. 5 at 82. This corresponds closely to the maximum velocity crank position for the conventional cutoff press illustrated. However, due to the 'early' commencement of the offset crank cutting stroke 75 at 78, an increase of approximately 25 percent in the angle and duration of crank rotation necessary to fully accelerate the ram occurs thereby significantly decreasing the forces required to accelerate the ram. This is illustrated in FIG. 5 by the respective slopes 82 and 84 of the non-offset and offset crank devices. The decreased acceleration requirement of the offset crank results in lower forces being applied to the ram during the critical cutting phase of the cutoff cycle thereby minimizing ram instability induced by such forces. The increased angle of rotation of the crank during cutoff necessarily reduces the angle of rotation of the offset crank during the return stroke which, in turn, results in higher ram velocities being achieved, at 86, as compared with conventional non-offset designs, at 88. Again, however, this is of little consequence due to the fact that the work piece has already been fully severed and the ram and die set are not under a cutting force load.

The invention is hereby claimed as follows:

1. In a cutoff press for cutting tube traveling along a horizontal path, a frame having a bed portion and a head portion between which the tube travels, a cutoff die set having a lower die and an upper die, stationary slide rails mounted on the bed portion to slidably support the lower die, a ram having slide rails for slidably supporting the upper die of the die set, and means for driving the ram through a cutoff cycle of a downward cutting stroke and an upward return stroke comprising, means mounting the ram for vertical movement only, a pair of horizontally spaced apart crankshafts rotatably supported by the head portion, means driving the crankshafts in opposite directions during a cutoff cycle, said crankshafts having cranks the centers of which are eccentric to the axes of crankshaft rotation, connecting rods connected at their upper ends to the cranks and at their lower ends to spaced apart wrist pins carried by said ram, and said wrist pin centers being spaced laterally from a plane extending vertically from the axes of crankshaft rotation, said laterally spaced wrist pins functioning to commence the downward acceleration of said ram prior to said crank reaching top-dead-center of said crank rotation and to direct the entire force acting on said connecting rods substantially downwardly during said cutoff cycle thereby minimizing lateral ram instability.

2. In a cutoff press defined by claim 1 wherein rotation of said pair of crankshafts through a first angle greater than 180 degrees defines the downward cutting stroke and rotation of said crankshafts through a second angle less than 180 degrees defines the upward return stroke.

3. In a cutoff press defined by claim 2, said first angle being approximately 189 degrees and said second angle being approximately 171 degrees.

4. In the cutoff press defined by claim 1, wherein said wrist pin centers are spaced outwardly of the axes of crankshaft rotation.

5. In the cutoff press defined by claim 1, wherein said wrist pin centers are spaced from the axes of crankshaft rotation a distance approximately equal to the eccentricity of the cranks.

6. In the cutoff press defined by claim 3, wherein said wrist pin centers are spaced from the axes of crankshaft rotation a distance approximately equal to the eccentricity of the cranks.

7. In the cutoff press defined by claim 1, wherein said wrist pin centers are spaced outwardly of the axes of crankshaft rotation such that the attitude of the connecting rods is substantially vertical during the downward cutting stroke.

8. In the cutoff press defined by claim 1, wherein said slide rails are parallel to the tube path, said crankshaft drive means drives the crankshafts at the same speed, said crankshafts are identical, and said connecting rods are of the same length.

9. In the cutoff press defined by claim 8, wherein said wrist pin centers are spaced outwardly of the axes of crankshaft rotation a distance equal to the eccentricity of the cranks.

10. In a machine for successively treating tubular stock traveling along a horizontal path including a frame having a bed portion and a head portion between which the stock travels, a ram supported by said head portion and overlying said bed portion, slide rails on the bed portion and the ram parallel to said path for slidably receiving a die set, and said die set having work engaging parts actuable by movement of said ram to perform an operation on said stock, the improvement in means for driving the ram through a stock treatment cycle in a downward work stroke and an upward return stroke, which drive means comprises means for mounting the ram for vertical movement only, a pair of horizontally spaced apart crankshafts rotatably supported by the head portion, means driving the crankshafts in opposite directions, said crankshafts having cranks the centers of which are eccentric to the axes of crankshaft rotation, connecting rods connected at their upper ends to the cranks and at their lower ends to spaced apart wrist pins carried by said ram, and said wrist pin centers being spaced laterally from a plane extending vertically from the axes of crankshaft rotation, said laterally spaced wrist pins functioning to commence the downward acceleration of said ram prior to said crank reaching top-dead-center of said crank rotation and to direct the entire force acting on said connecting rods substantially downwardly during said cutoff cycle therby minimizing lateral ram instability.

11. In a cutoff press for segmentally cutting tube traveling along a rectilinear path including a frame having a bed portion and a head portion between which the tube travels, a ram supported by said head portion in overlying relationship to said bed portion for rectilinear movement only perpendicular to said path, slide rails on the bed portion and the ram parallel to said path for slidably receiving a die set, and said die set having a shearing mechanism actuatable by movement of said ram to cut the tube, the improvement in means for driving the ram through a cutoff cycle having a cutting stroke and a return stroke, which drive means comprises a pair of spaced apart crankshafts rotatably supported by the head portion, the axes of said crankshafts being parallel to each other and in a common plane extending parallel to said path, means driving the crankshafts in timed relation in opposite directions, said crankshafts having cranks the centers of which are eccentric to the axes of crankshaft rotation, connecting rods connected at their upper ends to the cranks and at their lower ends to spaced apart wrist pins carried by said ram, the axes of the wrist pins being parallel to each other and the axes of crankshaft rotation and in a common plane parallel to the path, and said wrist pin axes being spaced outwardly from planes extending perpendicular to the path and in the axes of crankshaft rotation such that the attitude of the connecting rods during the cutting stroke is substantially perpendicular to the path, said laterally spaced wrist pins functioning to commence the downward acceleration of said ram prior to said crank reaching top-dead-center of said crank rotation and to direct the entire force acting on said connecting rods substantially downwardly during said cutoff cycle thereby minimizing lateral ram instability.

12. In the cutoff press defined in claim 11, wherein said wrist pin centers are spaced from the axes of crankshaft rotation a distance approximately equal to the eccentricity of the cranks.

* * * * *